(12) United States Patent
Heu

(10) Patent No.: US 9,864,176 B2
(45) Date of Patent: Jan. 9, 2018

(54) ZOOM LENS HAVING WIDE-ANGLE AND TELEPHOTO MODES AND PHOTOGRAPHING APPARATUS INCLUDING THE SAME

(71) Applicant: Samsung Electronics Co., Ltd., Gyeonggi-do (KR)

(72) Inventor: Min Heu, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 14 days.

(21) Appl. No.: 15/060,784

(22) Filed: Mar. 4, 2016

(65) Prior Publication Data
US 2016/0259154 A1   Sep. 8, 2016

(30) Foreign Application Priority Data
Mar. 5, 2015   (KR) ........................ 10-2015-0031121

(51) Int. Cl.
*G02B 9/60* (2006.01)
*G02B 15/16* (2006.01)
(Continued)

(52) U.S. Cl.
CPC .............. *G02B 15/16* (2013.01); *G02B 9/60* (2013.01); *G02B 13/002* (2013.01);
(Continued)

(58) Field of Classification Search
CPC ...... G02B 27/64; G02B 27/646; G02B 13/00; G02B 13/001; G02B 13/005; G02B 13/002; G02B 13/0045; G02B 9/00; G02B 9/60; G02B 15/14; G02B 15/16; G03B 2205/0007; G03B 2205/0015; H04N 5/23248; H04N 5/23264; H04N 5/2328; H04N 5/23287
(Continued)

(56) References Cited

U.S. PATENT DOCUMENTS 5,930,051 A   7/1999 Sato
6,236,516 B1   5/2001 Misaka
(Continued)

FOREIGN PATENT DOCUMENTS

WO   2014/129170 A1   8/2014

OTHER PUBLICATIONS

European Search Report dated Jul. 14, 2016.

*Primary Examiner* — Arnel C Lavarias
(74) *Attorney, Agent, or Firm* — Cha + Reiter, LLC.

(57) ABSTRACT

A zoom lens including a first lens group having a positive refractive power; a second lens group having a negative refractive power; a third lens group having a positive refractive power; a fourth lens group having a negative refractive power; and a fifth lens group having a positive refractive power. The first through fifth lens groups are arranged sequentially from an object side to an image side of the zoom lens, and the first lens group includes a doublet lens and a lens having a positive refractive power. The second lens group includes a first sub-lens group having a negative refractive power and a second sub-lens group having a negative refractive power that is arranged to perform a focusing function. Each of the lens groups is arranged to move when the zoom lens is zoomed.

14 Claims, 17 Drawing Sheets

(51) Int. Cl.
    *G02B 15/173*     (2006.01)
    *G02B 13/00*     (2006.01)
    *G02B 27/00*     (2006.01)
    *G02B 27/64*     (2006.01)

(52) U.S. Cl.
    CPC ......... *G02B 13/009* (2013.01); *G02B 15/173* (2013.01); *G02B 27/0025* (2013.01); *G02B 27/646* (2013.01)

(58) Field of Classification Search
    USPC ....... 359/554, 557, 642, 676, 683, 684, 685, 359/754, 763, 764, 766; 396/52, 55; 348/208.99, 208.4, 208.11, 208.7
    See application file for complete search history.

(56) References Cited

U.S. PATENT DOCUMENTS

| | | |
|---|---|---|
| 8,446,680 B2 | 5/2013 | Kai et al. |
| 2005/0219708 A1* | 10/2005 | Shibayama .......... G02B 15/173 359/686 |
| 2008/0218875 A1 | 9/2008 | Kuroda et al. |
| 2013/0342716 A1 | 12/2013 | Yamamoto et al. |
| 2015/0338622 A1 | 11/2015 | Kuzuhara et al. |

\* cited by examiner

ZOOM LENS HAVING WIDE-ANGLE AND TELEPHOTO MODES AND PHOTOGRAPHING APPARATUS INCLUDING THE SAME

CLAIM OF PRIORITY

This application claims the benefit of Korean Patent Application No. 10-2015-0031121, filed on Mar. 5, 2015, in the Korean Intellectual Property Office, the disclosure of which is incorporated herein in its entirety by reference.

BACKGROUND

1. Field

The present disclosure relates to zoom lenses that are compact and include lightweight focusing lens groups, and photographic apparatuses including the zoom lenses.

2. Description of the Related Art

In photographic apparatuses, such as digital cameras, interchangeable lens systems, and video cameras, users require a high resolution, a large aperture, and the like. Since the photographic apparatuses are suitable for miniaturization, they have recently been applied also to compact information terminals such as mobile phones. Also, consumers' expertise on photographic apparatuses has increased, and the development of compact and high-zoom-factor lenses has increased according to such market requirements. However, it may be difficult to provide compact and high-performance zoom lenses.

Also, the popularity of interchangeable lens cameras, single-lens reflex cameras, and mirrorless cameras has increased. The mirrorless cameras have a shorter flange back than the single-lens reflex cameras. Also, the single-lens reflex cameras mainly use a phase difference autofocus, while the mirrorless cameras mainly use a contrast autofocus.

SUMMARY

According to aspects of the disclosure, a zoom lens is provided comprising: a first lens group having a positive refractive power; a second lens group having a negative refractive power; a third lens group having a positive refractive power; a fourth lens group having a negative refractive power; and a fifth lens group having a positive refractive power, wherein the first lens group, the second lens group, the third lens group, the fourth lens group, and the fifth lens group are arranged sequentially from an object side to an image side of the zoom lens, wherein the first lens group comprises a doublet lens and a lens having a positive refractive power, wherein the second lens group comprises a first sub-lens group having a negative refractive power and a second sub-lens group having a negative refractive power that is arranged to perform a focusing function, wherein each of the first lens group, the second lens group, the third lens group, the fourth lens group, and the fifth lens group is arranged to move when the zoom lens is zoomed; and wherein the zoom lens satisfies the following condition: $0.4<BF_W/FL_W<1.1$, where $FL_W$ denotes a total focal length of the zoom lens when the zoom lens is in a wide-angle mode and $BF_W$ denotes a back focal length of the zoom lens when the zoom lens is in the wide-angle mode.

According to aspects of the disclosure, a photographic apparatus is provided comprising: a zoom lens; and an image sensor receiving an image formed by the zoom lens, wherein the zoom lens comprises a first lens group having a positive refractive power, a second lens group having a negative refractive power, a third lens group having a positive refractive power, a fourth lens group having a negative refractive power, and a fifth lens group having a positive refractive power, wherein the first lens group comprises a doublet lens and a lens having a positive refractive power, wherein the second lens group comprises a first sub-lens group having a negative refractive power and a second sub-lens group having a negative refractive power that is arranged to perform a focusing function, wherein each of the first lens group, the second lens group, the third lens group, the fourth lens group, and the fifth lens group is arranged to move when the zoom lens is zoomed from a wide-angle mode to a telephoto mode, and wherein the zoom lens satisfies the following condition: $0.4<BF_W/FL_W<1.1$, where $FL_W$ denotes a total focal length of the zoom lens when the zoom lens is in a wide-angle mode and $BF_W$ denotes a back focal length of the zoom lens when the zoom lens is in the wide-angle mode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
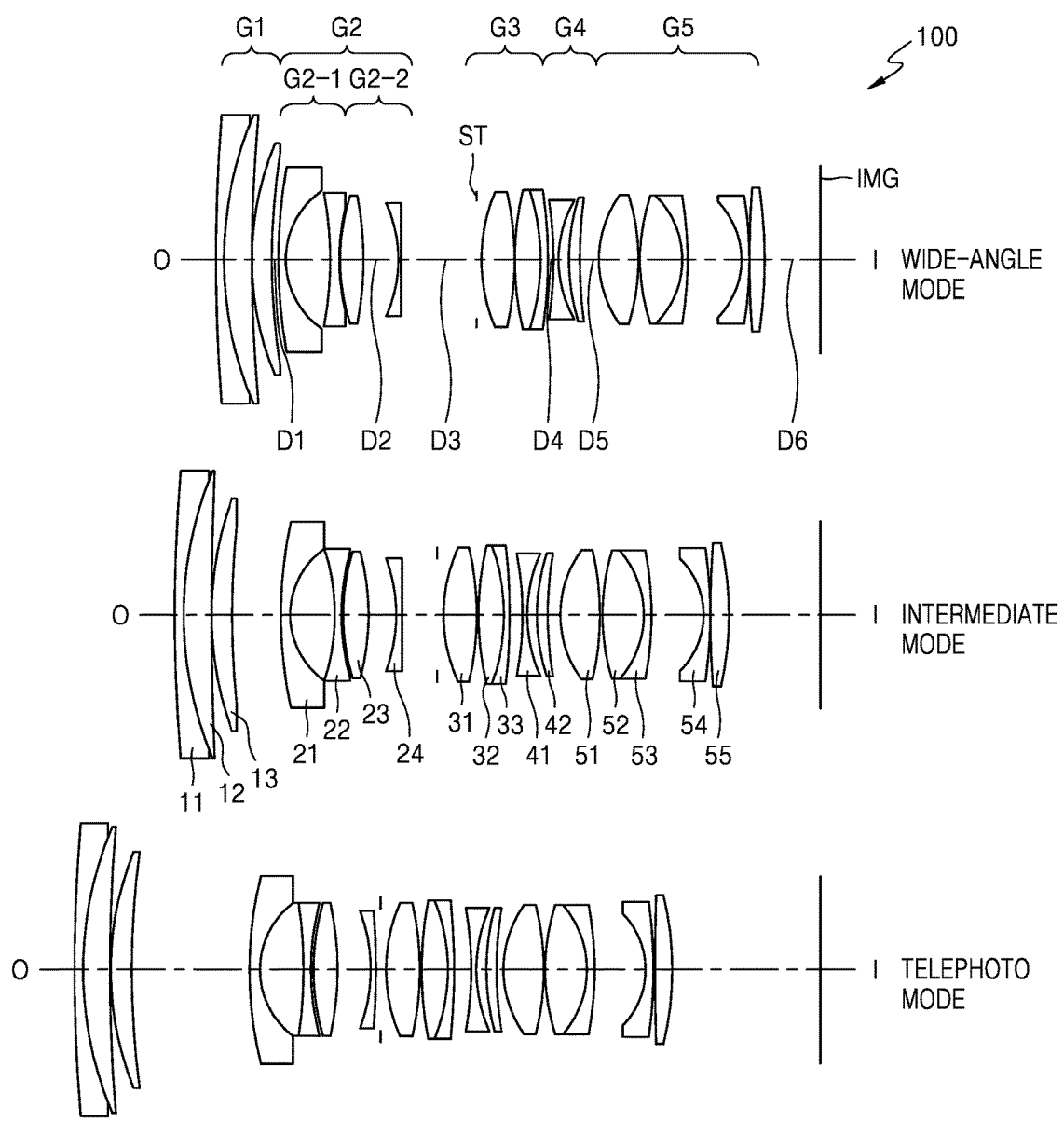
FIG. 1 is a diagram of an example of a zoom lens, according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as limiting the disclosure to the above examples. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, zoom lenses and photographic apparatuses including the same according to various embodiments will be described in detail with reference to the accompanying drawings.

FIG. 1 is a diagram of an example of a zoom lens 100, according to an embodiment of the present disclosure (e.g., a first embodiment).

The zoom lens 100 may include a first lens group G1 having a positive refractive power, a second lens group G2 having a negative refractive power, a third lens group G3 having a positive refractive power, a fourth lens group G4 having a negative refractive power, and a fifth lens group G5 having a positive refractive power, wherein the first to fifth lens groups G1, G2, G3, G4, and G5 are arranged sequentially from an object side O to an image side I of the zoom lens 100. For example, the image side of the zoom lens 100 may be the side facing an image plane where an image is formed (e.g., facing the surface of an image sensor), and the object side of the zoom lens 100 may be the side facing a subject. Furthermore, the object side surface of a particular lens may be the lens surface facing the subject, and the image side surface thereof may be a lens surface facing the image plane (e.g., facing the surface of an image sensor).

When the zoom lens 100 zooms from a wide-angle mode to a telephoto mode, each of the first to fifth lens groups G1, G2, G3, G4, and G5 may move. Also, each of the third lens group G3, the fourth lens group G4, and the fifth lens group G5 may move such that the distance between the third lens group G3 and the fifth lens group G5 does not change. In other words, the movements of the third lens group G3 and the fifth lens group G5 may be synchronized with one another. Also, when zooming, all of the first to fifth lens groups G1, G2, G3, G4, and G5 may move closer to the object side of the zoom lens 100 when the zoom lens 100 is in the telephoto mode than when the zoom lens is in the wide-angle mode. Accordingly, an image plane curvature change may be reduced.

The zoom lens 100 may include at least one iris diaphragm ST. For example, the iris diaphragm ST may be disposed between the second lens group G2 and the third lens group G3.

The first lens group G1 may include, for example, a doublet lens and a lens 13 having a positive refractive power. The doublet lens may include, for example, a lens 11 having a negative refractive power and a lens 12 having a positive refractive power.

Some lenses of the second lens group G2 may be used to perform focusing. The second lens group G2 may include, for example, a first sub-lens group G2-1 having a negative refractive power and a second sub-lens group G2-2 having a negative refractive power. The second sub-lens group G2-2 may be used to perform focusing. The first sub-lens group G2-1 may include at least one negative lens. For example, the first sub-lens group G2-1 may include a plurality of negative lenses. The at least one negative lens may include at least one aspheric surface and may be a high-refractive lens for reducing coma aberration and astigmatism. For example, the at least one negative lens may have a refractive index of about 1.73 or more. Additionally or alternatively, the at least one negative lens may have a refractive index of about 1.73 to about 2.0. Referring to FIG. 1, the first sub-lens group G2-1 may include a first negative lens 21 and a second negative lens 22. A third positive lens 23 may be further provided on the image side of the second negative lens 22.

For example, the second sub-lens group G2-2 may include one lens or two lenses. FIG. 1 illustrates an example in which the second sub-lens group G2-2 includes one lens 24. Because the second sub-lens group G2-2 includes a small number of lenses, it may be driven with speed and precision while the zoom lens 100 is being focused (e.g., when contrast focusing is performed).

Also, since a driving unit for moving the second sub-lens group for a focusing operation may be formed to be compact, the total volume of the photographic apparatus may be reduced.

The third lens group G3 may include, for example, at least one positive lens and a doublet lens. Referring to FIG. 1, the third lens group G3 may include a fourth positive lens 31 and a doublet lens including a fifth positive lens 32 and a sixth positive lens 33, and may easily compensate spherical aberration.

The fourth lens group G4 may include at least one negative lens. Additionally or alternatively, the fourth lens group G4 may include at least one aspherical lens. For example, the fourth lens group G4 may include a seventh negative lens 41 and an eighth positive lens 42. The fourth lens group G4 may perform image stabilization. According to aspects of the disclosure, because the fourth lens group includes a small number of lenses, the image stabilization performance of the zoom lens may be improved.

The fifth lens group G5 may include at least one positive lens and a doublet lens. The fifth lens group G5 may be used to compensate astigmatism and astigmatic field curvature. Additionally or alternatively, the fifth lens group G5 may include at least one aspherical lens. As illustrated in FIG. 1, the fifth lens group G5 may include a ninth positive lens 51, a tenth positive lens 52, an eleventh negative lens 53, an eleventh negative lens 54, and a twelfth positive lens 55. Because the ninth positive lens 51 located on the object side of the fifth lens group is an aspherical lens formed of a low-dispersion material, the spherical aberration for each wavelength may be effectively compensated. The fifth lens group G5 is not limited thereto and may be modified according to various embodiments.

Spherical aberration and astigmatism may be effectively compensated by the third lens group G3 and the fifth lens group G5. In the case of such a main aberration compensation group, the total performance of the zoom lens may be greatly changed due to a manufacturing tolerance. For example, the resolution thereof may be degraded because the asymmetric error characteristics of the zoom lens, such as a tilt and a decenter caused by a manufacturing error, are greatly changed according to a zooming operation. Thus, according to an embodiment, in order to reduce a zooming performance deviation, the relative decenter and tilt change between the third lens group and the fifth lens group may be reduced by setting the third lens group and the fifth lens group to move in synch with each other (e.g., move by substantially same distance, move at substantially the same time, and/or move at substantially the same speed).

An image of the subject may be incident on an image plane IMG after passing through the first to fifth lens groups G1, G2, G3, G4, and G5. The image plane IMG may be, for example, an imaging device surface or an image sensor surface. The image sensor may include, for example, a CMOS or a CCD.

At least one optical filter (not illustrated) may be provided between the fifth lens group G5 and the image plane IMG. The optical filter may include, for example, at least one of a low-pass filter, an infrared (IR)-cut filter, and a cover glass. In some implementations, when an IR-cut filter is provided as the optical filter, at least some of the IR light that is incident on the zoom lens 100 may be prevented from reaching the image plane. Alternatively, in some implementations, the zoom lens may not include the optical filter. FIG. 1 illustrates an example in which the optical filter is not included.

The zoom lens according to an embodiment may have a viewing angle of, for example, about 70° to about 90°. The F-number of the zoom lens 100 (Fno) may have a range of about 2 to about 4, and the brightness of the zoom lens 100 may not change while the zoom lens is zoomed. A zoom factor associated with the zoom lens 100 may have a range of about 2.5 times to about 4 times.

The zoom lens according to an embodiment may satisfy the following equation.

$$0.4 < BF_W/FL_W < 1.1 \quad \text{<Equation 1>}$$

In Equation 1, $FL_W$ denotes a total focal length of the zoom lens 100 while the zoom lens 100 is in the wide-angle mode, and $BF_W$ denotes a back focal length of the zoom lens 100 while the zoom lens 100 is in the wide-angle mode. The back focal length may refer to an air gap between the image plane IMG and the image side surface of the lens located at the uppermost side of the zoom lens.

Equation 1 defines the ratio between the back focal length and the focal length in the wide-angle mode. When the ratio $BF_W/FL_W$ exceeds the upper limit value of Equation 1, the back focal length may be too large and thus the zoom lens may be difficult to miniaturize. For example, it may be difficult to implement a mirrorless camera having a short flange back. According to aspects of the disclosure, the flange back of the zoom lens 100 may refer to the distance from the lens mount (attachment) start portion to the image plane.

When the ratio $BF_W/FL_W$ is smaller than the lower limit value of Equation 1, the space may be small and thus the shutter may not be disposed. Therefore, since the external diameter of the zoom lens is increased, it may be difficult to implement a compact and lightweight zoom lens.

The zoom lens according to an embodiment may satisfy the following equation.

$$0.9 < FL\_RG_W/BF_W < 1.35 \quad \text{<Equation 2>}$$

In Equation 2, $FL\_RG_W$ denotes a combined focal length of the third lens group, the fourth lens group, and the fifth lens group when the zoom lens 100 is in the wide-angle mode.

According to aspects of the disclosure, Equation 2 limits the back focal length of the zoom lens 100. When the ratio $FL\_RG_W/BF_W$ exceeds the upper limit value thereof, the zoom lens may be difficult to miniaturize. When the ratio $FL\_RG_W/BF_W$ is smaller than the lower limit value thereof, the refractive power of the third to fifth lens groups G3, G4, and G5 may become too strong. Thus, because the refractive power distribution of each lens group may be imbalanced, achieving quality aberration compensation may become difficult.

The zoom lens according to an embodiment may satisfy the following equation.

$$0.75 < \frac{FL\_Fr_W}{FL\_RG_W} < 1.25 \quad \text{<Equation 3>}$$

In Equation 3, $FL\_RG_W$ denotes a combined focal length of the third lens group, the fourth lens group, and the fifth lens group in the wide-angle mode, and $FL\_FG_W$ denotes a combined focal length of the first lens group and the second lens group in the wide-angle mode.

Equation 3 defines the refractive power ratio of the front lens group (e.g., the first lens group and the second lens group) located on the object side of the iris diaphragm and the rear lens group (e.g., the third lens group, the fourth lens group, and the fifth lens group) located on the image side of the iris diaphragm.

When the upper limit value of Equation 3 is exceeded, the refractive power of the front lens group may become too small. Thus, since the external diameter of the lens of the rear lens group may be difficult to reduce, a lightweight image stabilization group may be difficult to implement. When the lower limit value of Equation 3 is exceeded, the refractive power of the rear lens group becomes too small. Thus, since the back focal length may become too large, it may be difficult to provide a short flange back.

For example, in a large-aperture standard zoom lens, when the aperture of the rear lens group located on the image side of the iris diaphragm is increased, since the weight of the image stabilization group located on the rear lens group may be increased, the image stabilization performance of the zoom lens 100 may be reduced. Thus, according to an embodiment, the aperture of the rear lens group after the iris diaphragm can be miniaturized by reducing the negative refractive power of the front lens group(s) (e.g., the first lens group and the second lens group) that are disposed on the object side of the iris diaphragm ST. Additionally or alternatively, since the fourth lens group G4 includes at least one aspherical lens, the aberration may be effectively compensated even by a small number of lenses. Accordingly, since the weight of the rear lens group may be reduced, the performance of the image stabilization group (e.g., the fourth lens group) may be improved.

Additionally or alternatively, since the positive refractive power of the rear lens group may be increased, a short back focal length may be implemented. Accordingly, the zoom lens according to an embodiment may also be applied to a mirrorless camera having a short flange back.

According to aspects of the disclosure, at least one of the aspherical lenses of the fifth lens group may satisfy the following equation.

$$80 < vd3C\_ASP \qquad \text{<Equation 4>}$$

In Equation 4, vd3C_ASP denotes an Abbe number of at least one aspherical lens included in the fifth lens group. Because the aspherical lens of the fifth lens group includes a lens of a low-dispersion material as in Equation 4, spherical aberration may be effectively compensated.

The aspheric surface used in the zoom lens according to an embodiment may be defined as follows.

When an optical axis direction is set as an X-axis and a direction perpendicular to the optical axis direction is set as a Y-axis, an aspherical shape may be represented by the following equation. The traveling direction of rays refers to a positive value. Herein, "x" denotes the distance in the optical axis direction from the vertex of the lens with respect to a point of the lens, "y" denotes the distance in the direction perpendicular to the optical axis with respect to a point of the lens, "K" denotes a conic constant, "A, B, C, D, . . . " denotes aspherical coefficients, and "c" denotes a reciprocal number (1/R) of the curvature radius at the vertex of the lens.

$$x = \frac{cy^2}{1 + \sqrt{1 - (K+1)c^2 y^2}} + Ay^4 + By^6 + Cy^8 + Dy^{10} + \ldots \qquad \text{<Equation 5>}$$

According to aspects of the disclosure, a zoom lens may be implemented by various numerical embodiments according to various designs as follows.

In each of the discussed embodiments, lens surface numbers 1, 2, 3 . . . n (where "n" is a natural number) refer to the order in which different lens surfaces are ordered from the object side O to the image side I of the zoom lens 100. For example, lens surface 1 may be the lens surface that is the closest to the object side O of the zoom lens 100. Similarly, lens surface 2 may be the lens surface that is the next closest to the object side O of the zoom lens 100. And the lens surface n may be the lens surface that is the furthest away from the object side O of the zoom lens 100.

In the present example, "EFL" denotes the focal length of the zoom lens system, "Fno" denotes an F-number, "2w" denotes a viewing angle, "R" denotes a curvature radius, "Dn" denotes the thickness of the lens or the air gap between lenses, "Nd" denotes a refractive index, and "Vd" denotes an Abbe number. "ST" denotes the iris diaphragm, and "*" and "ASP" denote the aspherical surface.

First Embodiment

FIG. 1 illustrates a zoom lens according to a first embodiment of the present disclosure. Table 1 below includes design data associated with the zoom lens of FIG. 1 (e.g., design data associated with the first embodiment). According to the embodiment of FIG. 1, the focal length (EFL) of the zoom lens is in the range of 24.7~67.7 mm; the F-number (Fno) of the zoom lens is in the range of 2.05~2.9; and the viewing angle (2w) of the zoom lens is in the range of 86.10~18.9°.

TABLE 1

| Lens Surface | R | Dn | Nd | Vd |
|---|---|---|---|---|
| 1 | 400.000 | 2.00 | 1.84666 | 23.8 |
| 2 | 82.786 | 6.20 | 1.77250 | 49.6 |
| 3 | 414.716 | 0.15 | | |
| 4 | 72.235 | 4.96 | 1.83481 | 42.7 |
| 5 | 255.133 | D1 | | |
| 6 | 99.816 | 2.00 | 1.83481 | 42.7 |
| 7 | 19.338 | 10.18 | | |
| 8* | −94.443 | 2.10 ASP | 1.73986 | 49.1 |
| K: 14.700000 A: 1.227013e−006 B: −5.256997e−009 C: 0.000000e+000 D: 0.000000e+000 | | | | |
| 9* | 57.808 | 0.43 ASP | | |
| K: −0.655352 A: −6.301379e−006 B: −8.742063e−009 C: −1.360921e−011 D: 2.121332e−014 | | | | |
| 10 | 52.401 | 5.25 | 1.84666 | 23.8 |
| 11 | −71.259 | D2 | | |
| 12 | −33.916 | 1.00 | 1.61800 | 63.4 |
| 13 | −256.147 | D3 | | |
| ST | Infinity | 1.10 | | |
| 15* | 31.210 | 7.87 ASP | 1.58963 | 61.1 |
| K: 0.000000 A: −9.138016e−006 B: −4.563339e−009 C: −3.690113e−012 D: −8.326730e−014 | | | | |
| 16* | −68.225 | 0.15 ASP | | |
| K: 0.000000 A: −1.966907e−006 B: 2.368400e−009 C: −1.515042e−011 D: −5.900039e−014 | | | | |
| 17 | 69.334 | 6.02 | 1.49700 | 81.6 |
| 18 | −44.334 | 1.30 | 1.84666 | 23.8 |
| 19 | −152.030 | D4 | | |
| 20 | −72.767 | 1.00 | 1.59349 | 67.0 |
| 21 | 30.491 | 2.46 | | |
| 22* | 58.043 | 2.56 ASP | 1.68381 | 31.3 |
| K: 0.482099 A: 7.536818e−006 B: −8.682716e−009 C: 4.965999e−011 D: −5.757793e−014 | | | | |
| 23* | 118.360 | D5 ASP | | |
| K: 0.000000 A: 7.005483e−008 B: −1.250336e−008 C: 5.826571e−011 D: −8.475834e−014 | | | | |
| 24* | 24.000 | 9.02 ASP | 1.48476 | 85.3 |
| K: −1.000000 A: 1.421634e−006 B: 2.033479e−008 C: −3.831439e−012 D: 6.122977e−014 | | | | |
| 25 | −62.815 | 0.51 | | |
| 26 | 43.194 | 9.68 | 1.49700 | 81.6 |
| 27 | −21.450 | 1.46 | 1.91082 | 35.2 |
| 28 | −85.931 | 12.50 | | |
| 29* | −16.675 | 1.60 ASP | 1.80470 | 40.9 |
| K: 0.000000 A: 2.292527e−005 B: 1.832128e−008 C: −1.482554e−010 D: 1.790300e−012 | | | | |
| 30* | −55.715 | 0.20 ASP | | |
| K: 0.000000 A: 2.606901e−005 B: −5.780877e−008 C: 1.510109e−010 D: −1.394237e−013 | | | | |
| 31 | 268.435 | 3.75 | 1.92286 | 20.9 |
| 32 | −83.759 | D6 | | |
| IMG | | | | |

Table 2 below provides an example of various distances associated with the zoom lens 100 and corresponding lens modes associated with those distances.

TABLE 2

| Variable Distance | Wide-angle Mode | Intermediate Mode | Telephoto Mode |
|---|---|---|---|
| D1 | 0.8 | 11.383 | 27.367 |
| D2 | 7.987 | 7.001 | 7.899 |
| D3 | 17.153 | 8.556 | 1.513 |
| D4 | 1.685 | 3.112 | 4.375 |
| D5 | 4.190 | 2.763 | 1.5 |
| D6 | 12.975 | 21.703 | 34.864 |

Figure 2A:
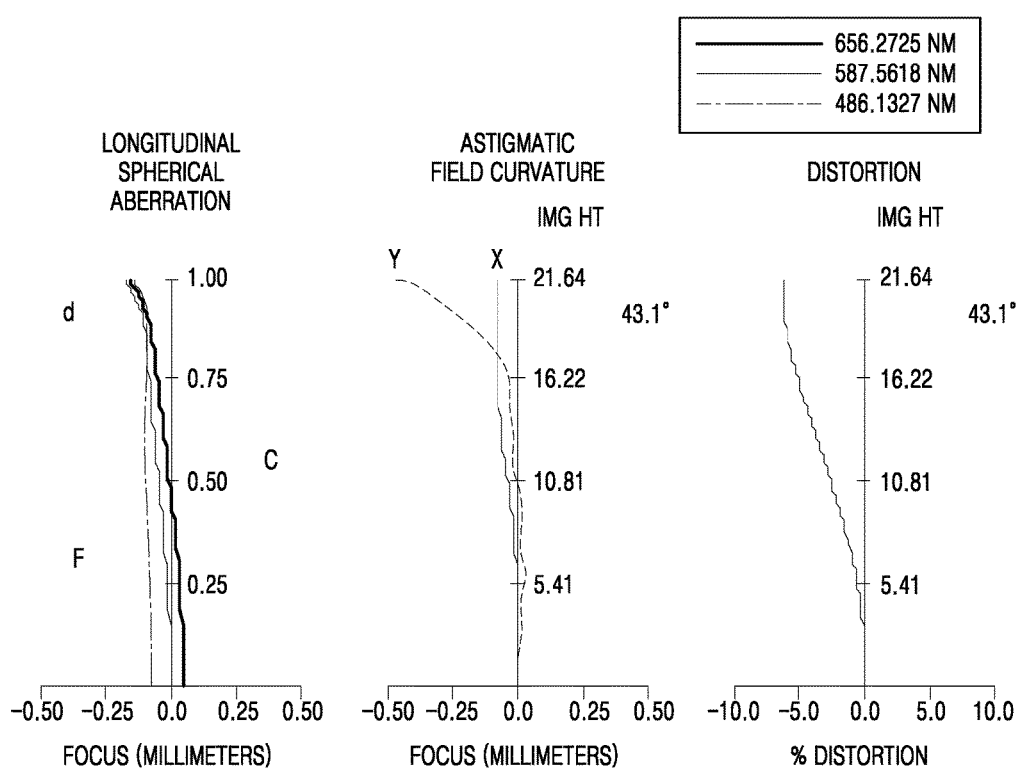
FIG. 2A is a graph illustrating longitudinal spherical aberration, astigmatic field curvature, and distortion associated with the zoom lens of FIG. 1, when the zoom lens of FIG. 1 is in a wide-angle mode, according to an embodiment of the present disclosure.
Figure 2B:
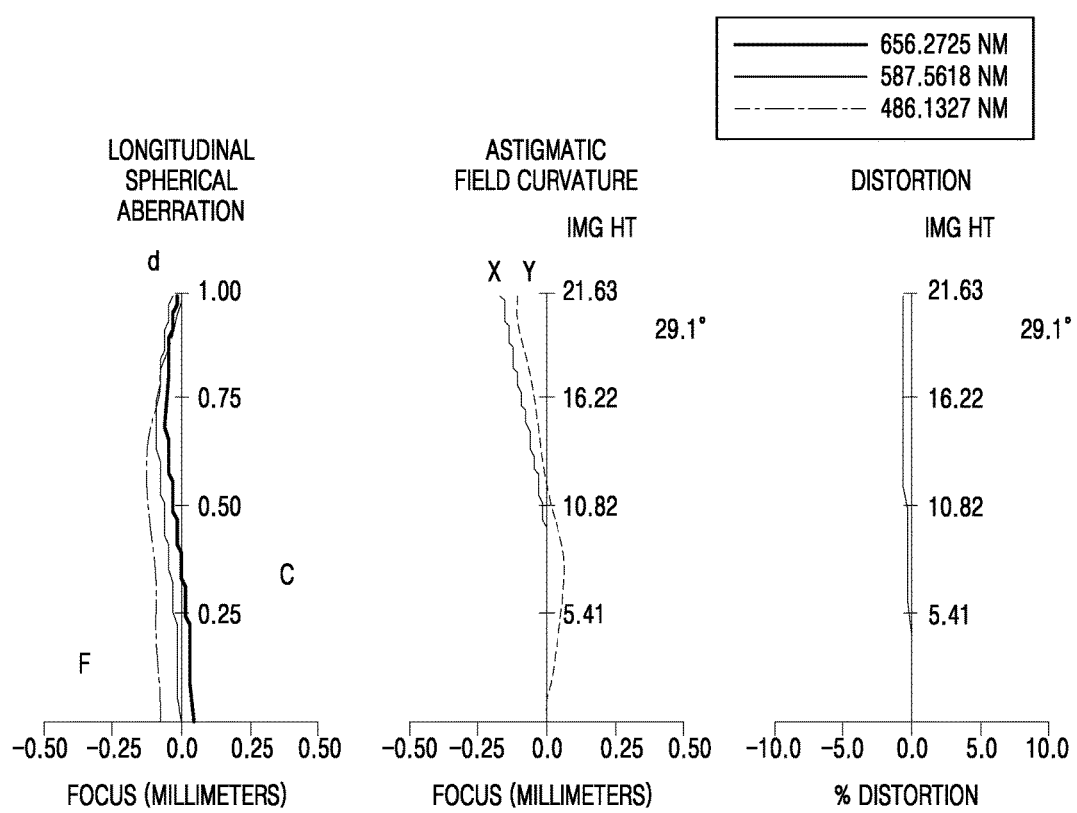
FIG. 2B is a graph illustrating longitudinal spherical aberration, astigmatic field curvature, and distortion associated with the zoom lens of FIG. 1, when the zoom lens of FIG. 1 is in an intermediate mode, according to an embodiment of the present disclosure.
Figure 2C:
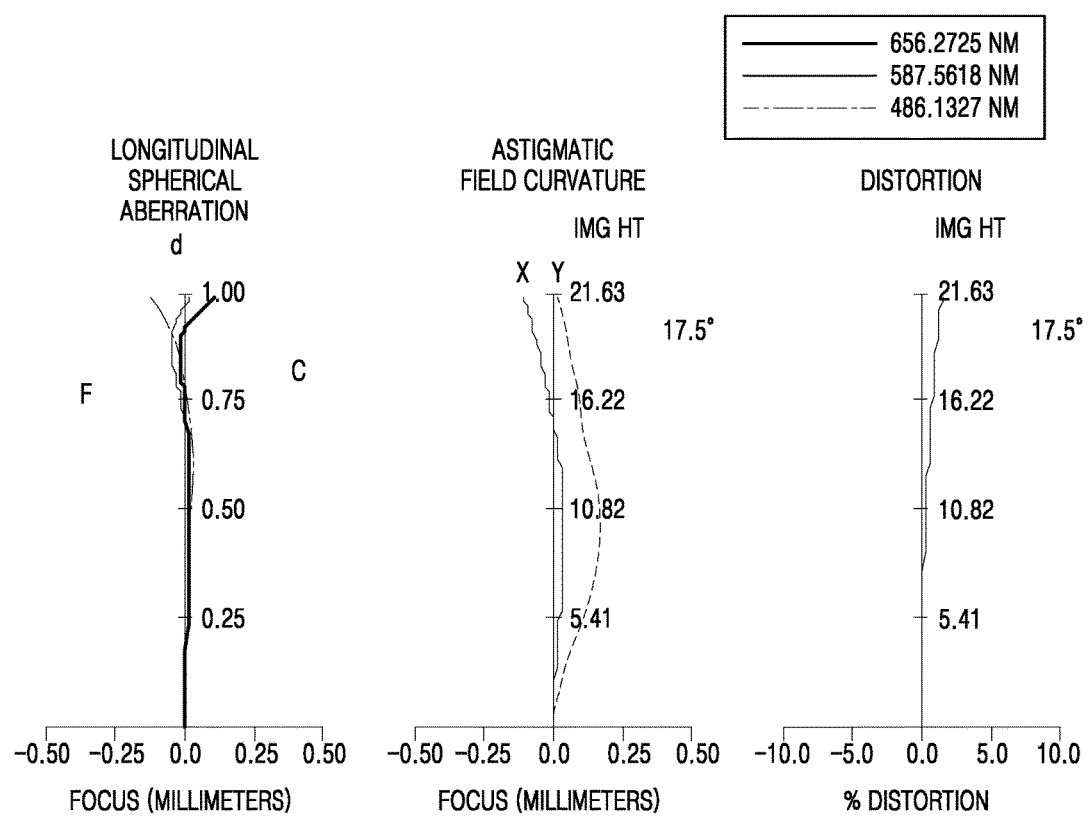
FIG. 2C is a graph illustrating longitudinal spherical aberration, astigmatic field curvature, and distortion associated with the zoom lens of FIG. 1, when the zoom lens of FIG. 1 is in a telephoto mode, according to an embodiment of the present disclosure.

FIGS. 2A, 2B, and 2C are graphs illustrating a longitudinal spherical aberration, an astigmatic field curvature, and a distortion associated with the zoom lens of FIG. 1 when the zoom lens is in a wide-angle mode, an intermediate mode, and a telephoto mode, respectively. A tangential field curvature and a sagittal field curvature are illustrated as examples of the astigmatic field curvature.

Second Embodiment

Figure 3:
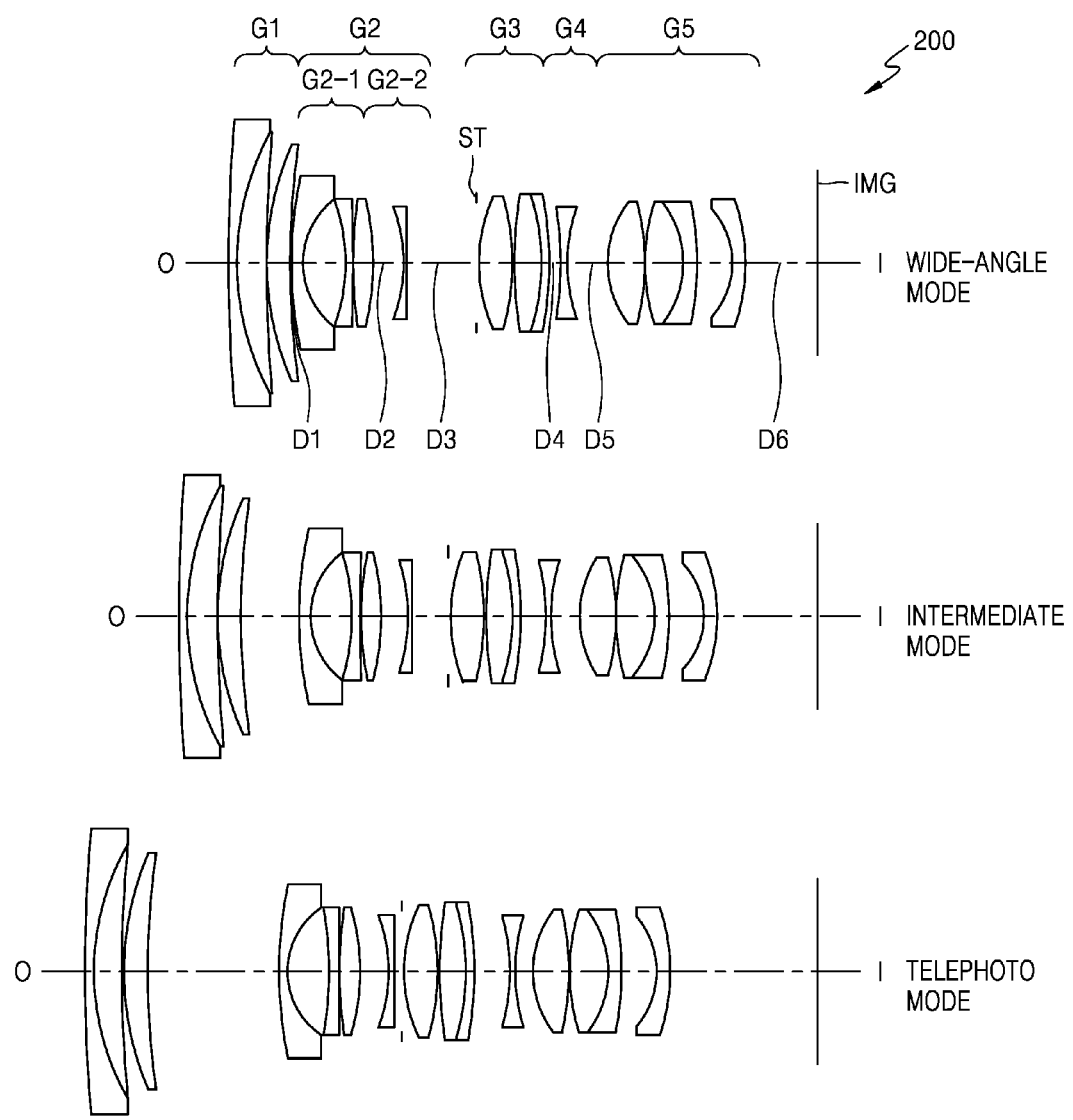
FIG. 3 is a diagram of an example of a zoom lens, according to another embodiment of the present disclosure.

FIG. 3 is a diagram of an example of a zoom lens 200, according to another embodiment of the present disclosure (e.g., a second embodiment). Table 3 below includes design data associated with the zoom lens 200. According to the embodiment of FIG. 3, the focal length (EFL) of the zoom lens 200 is in the range of 24.72~67.7 mm, the F-number (Fno) of the zoom lens 200 is in the range of 2.88~2.88, and the viewing angle (2w) of the zoom lens 200 is in the range of 86.54~34.88°.

TABLE 3

| Lens Surface | R | Dn | Nd | Vd |
|---|---|---|---|---|
| 1 | Infinity | 0.00 | | |
| 2 | 400.000 | 2.00 | 1.84666 | 23.8 |
| 3 | 64.101 | 7.00 | 1.77250 | 49.6 |
| 4 | 400.000 | 0.15 | | |
| 5 | 67.030 | 5.43 | 1.83481 | 42.7 |
| 6 | 198.459 | D1 | | |
| 7 | 120.791 | 2.00 | 1.83481 | 42.7 |
| 8 | 18.807 | 9.74 | | |
| 9* | −74.377 | 2.10 | 1.73986 | 49.1 |
| ASP | | | | |
| K: 15.000000 A: 7.020277e−006 B: −2.166327e−008 | | | | |
| C: 0.000000e+000 D: 0.000000e+000 | | | | |
| 10* | 134.628 | 0.20 | | |
| ASP | | | | |
| K: −7.685173 A: −4.809641e−006 B: −3.344497e−008 | | | | |
| C: −2.197003e−011 D: 1.167964e−014 | | | | |
| 11 | 89.044 | 4.65 | 1.84666 | 23.8 |
| 12 | −57.405 | D2 | | |
| 13 | −34.643 | 1.00 | 1.59349 | 67.0 |
| 14 | −1144.441 | D3 | | |
| ST | Infinity | 1.00 | | |
| 16* | 32.832 | 7.91 | 1.58963 | 61.1 |
| ASP | | | | |
| K: 0.000000 A: −9.350332e−006 B: −7.762828e−009 | | | | |
| C: −2.747548e−011 D: −9.849222e−014 | | | | |
| 17* | −54.837 | 0.15 | | |
| ASP | | | | |
| K: 0.000000 A: 2.663275e−006 B: −1.691379e−008 | | | | |
| C: 1.078768e−011 D: −1.455365e−013 | | | | |
| 18 | 96.430 | 6.21 | 1.49700 | 81.6 |
| 19 | −51.397 | 2.00 | 1.84666 | 23.8 |
| 20 | −80.352 | D4 | | |
| 21* | −61.569 | 1.31 | 1.58375 | 59.1 |
| ASP | | | | |
| K: 0.000000 A: −9.036106e−006 B: 5.288998e−008 | | | | |
| C: −1.963999e−010 D: 5.590274e−013 | | | | |
| 22* | 39.435 | D5 | | |
| ASP | | | | |
| K: 0.000000 A: −1.837356e−005 B: 7.207846e−008 | | | | |
| C: −2.564238e−010 D: 5.998742e−013 | | | | |

TABLE 3-continued

| Lens Surface | R | Dn | Nd | Vd |
|---|---|---|---|---|
| 23* | 24.300 | 8.52 | 1.48383 | 84.9 |
| ASP | | | | |
| K: −1.000000 A: 7.853329e−006 B: 1.470016e−008 | | | | |
| C: 1.099923e−011 D: 7.401486e−014 | | | | |
| 24 | −59.273 | 0.18 | | |
| 25 | 47.813 | 8.96 | 1.49700 | 81.6 |
| 26 | −21.600 | 3.20 | 1.91082 | 35.2 |
| 27 | −73.650 | 8.67 | | |
| 28* | −32.556 | 3.00 | 1.80489 | 40.5 |
| ASP | | | | |
| K: 0.000000 A: −1.229677e−004 B: 1.730551e−007 | | | | |
| C: −2.063202e−012 D: 5.679411e−013 | | | | |
| 29* | −150.000 | D6 | | |
| ASP | | | | |
| K: 0.000000 A: −9.423721e−005 B: 3.080037e−007 | | | | |
| C: −4.967999e−010 D: 6.141163e−013 | | | | |
| IMG | | | | |

Table 4 below provides an example of various distances associated with the zoom lens 200 and corresponding lens modes associated with those distances.

TABLE 4

| Variable Distance | Wide-angle Mode | Intermediate Mode | Telephoto Mode |
|---|---|---|---|
| D1 | 0.800 | 14.217 | 31.092 |
| D2 | 6.700 | 6.277 | 7.156 |
| D3 | 16.120 | 8.185 | 1.600 |
| D4 | 3.098 | 5.725 | 8.263 |
| D5 | 9.250 | 6.623 | 4.085 |
| D6 | 16.636 | 23.360 | 34.233 |

Figure 4A:
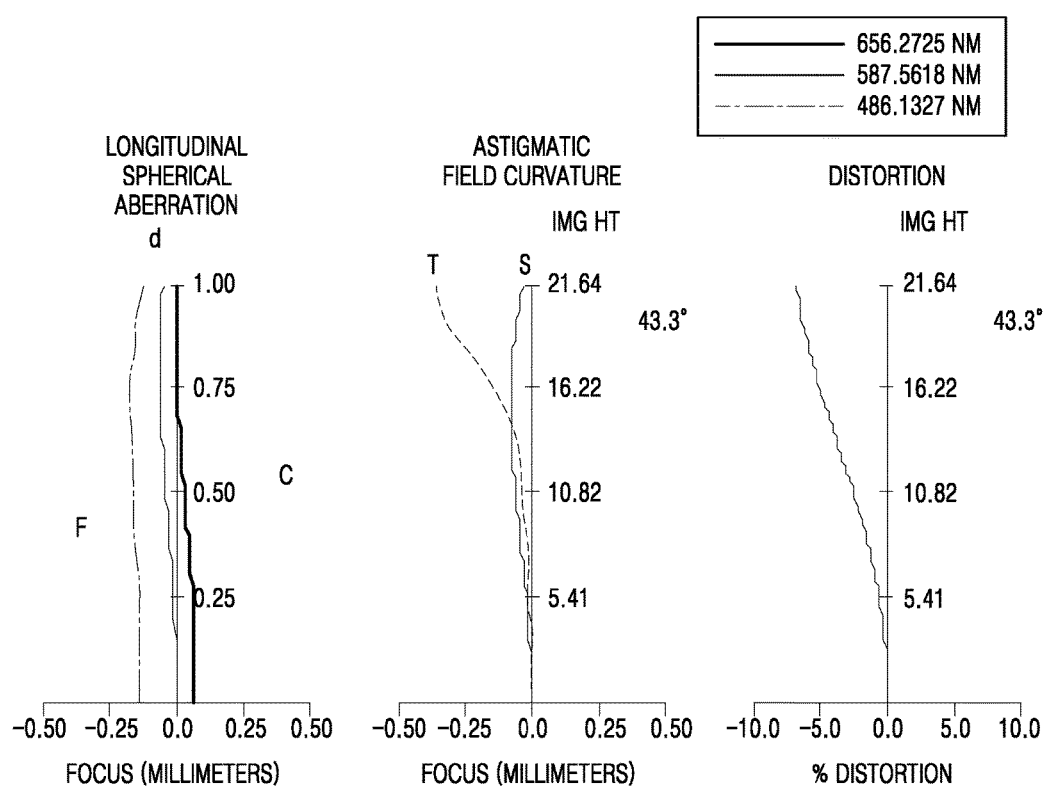
FIG. 4A is a graph illustrating longitudinal spherical aberration, astigmatic field curvature, and distortion associated with the zoom lens of FIG. 3, when the zoom lens of FIG. 3 is in a wide-angle mode, according to an embodiment of the present disclosure.
Figure 4B:
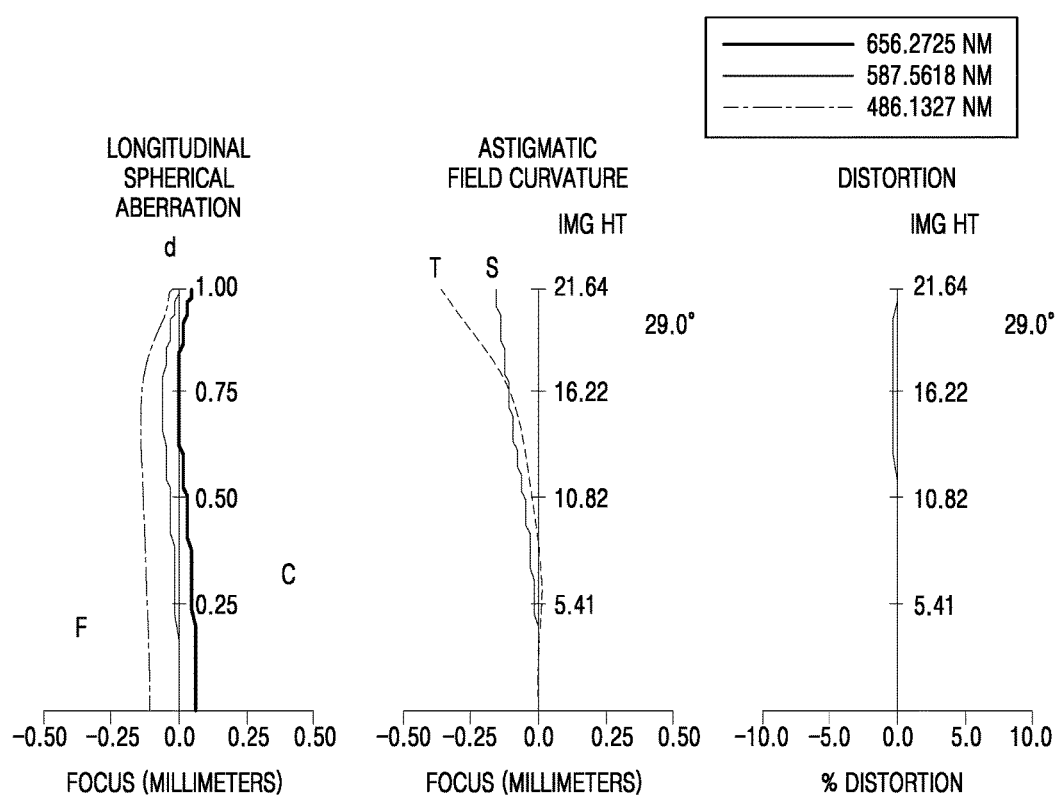
FIG. 4B is a graph illustrating longitudinal spherical aberration, astigmatic field curvature, and distortion associated with the zoom lens of FIG. 3, when the zoom lens of FIG. 3 is in an intermediate mode, according to an embodiment of the present disclosure.
Figure 4C:
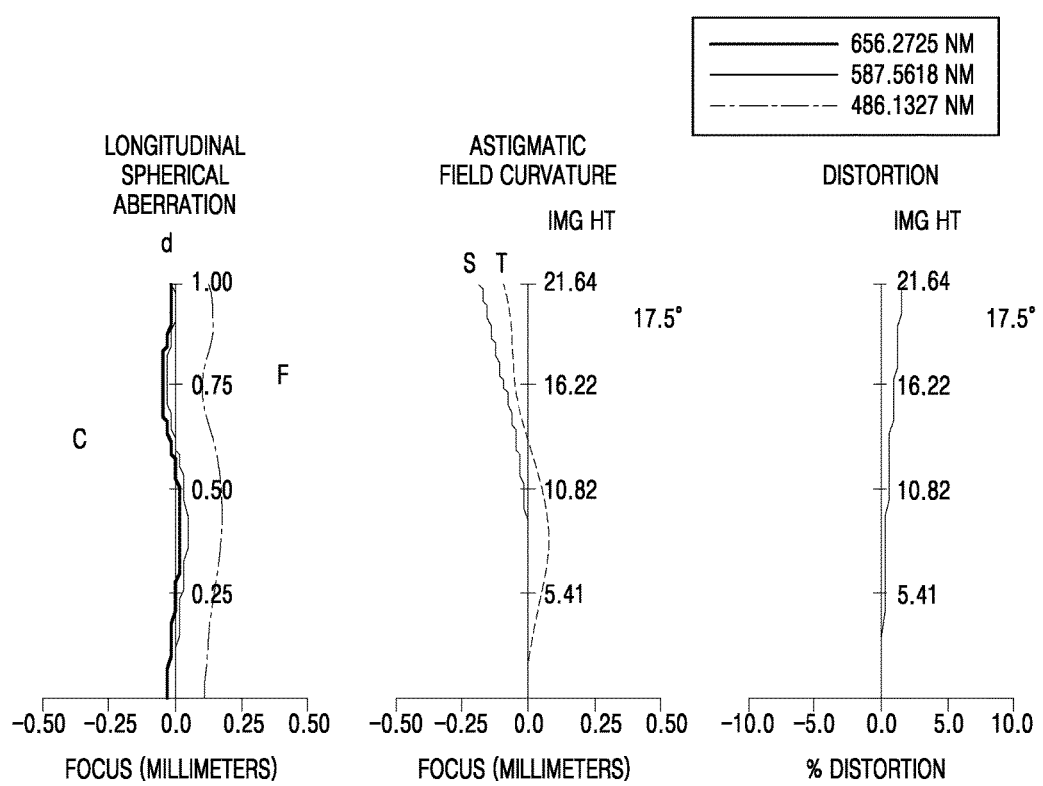
FIG. 4C is a graph illustrating longitudinal spherical aberration, astigmatic field curvature, and distortion associated with the zoom lens of FIG. 3, when the zoom lens of FIG. 3 is in a telephoto mode, according to an embodiment of the present disclosure.

FIGS. 4A, 4B, and 4C are graphs illustrating a longitudinal spherical aberration, an astigmatic field curvature, and a distortion associated with the zoom lens of FIG. 3 when the zoom lens is in a wide-angle mode, an intermediate mode, and a telephoto mode, respectively.

Third Embodiment

Figure 5:
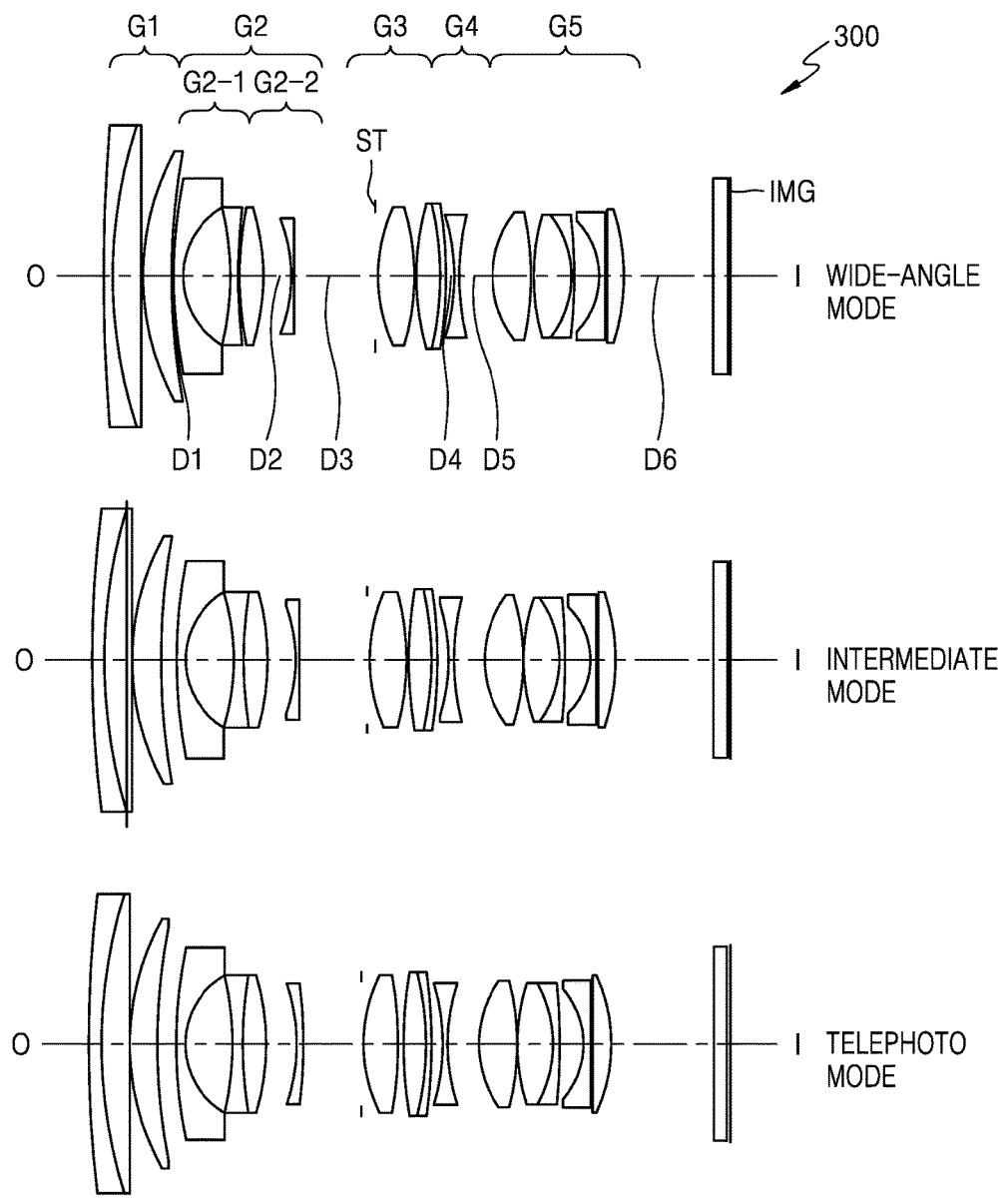
FIG. 5 is a diagram of an example of a zoom lens, according to yet another embodiment of the present disclosure.

FIG. 5 is a diagram of an example of a zoom lens 300, according to yet another embodiment of the present disclosure (e.g., a third embodiment). Table 5 below includes design data associated with the zoom lens 300. According to the embodiment of FIG. 5, the focal length (EFL) of the zoom lens 300 is in the range of 24.7~67.7 mm, the F-number (Fno) of the zoom lens 300 is in the range of 2.9~2.9, and the viewing angle (2w) of the zoom lens 300 is in the range of 86.64~34.91°.

TABLE 5

| Lens Surface | R | Dn | Nd | Vd |
|---|---|---|---|---|
| 1 | Infinity | 0.00 | | |
| 2 | 400.000 | 2.00 | 1.84666 | 23.8 |
| 3 | 103.358 | 6.19 | 1.61919 | 60.4 |
| 4 | 8713.646 | 0.15 | | |
| 5 | 56.564 | 6.21 | 1.68500 | 50.4 |
| 6 | 142.880 | D1 | | |
| 7 | 119.213 | 2.00 | 1.74516 | 42.0 |
| 8 | 17.913 | 10.55 | | |
| 9* | −74.915 | 2.10 | 1.73986 | 49.1 |
| ASP | | | | |
| K: 15.000000 A: 5.931240e−006 B: −1.663765e−008 | | | | |
| C: 0.000000e+000 D: 0.000000e+000 | | | | |

TABLE 5-continued

| Lens Surface | R | Dn | Nd | Vd |
|---|---|---|---|---|
| 10* | 81.024 | 0.20 | | |
| | ASP | | | |
| | K: −12.521808 A: −3.688382e−006 B: −3.087216e−008 | | | |
| | C: −2.422351e−011 D: 1.967213e−014 | | | |
| 11 | 88.214 | 5.07 | 1.84666 | 23.8 |
| 12 | −50.739 | D2 | | |
| 13 | −35.618 | 1.00 | 1.61800 | 63.4 |
| 14 | −678.480 | D3 | | |
| ST | Infinity | 0.90 | | |
| 16* | 30.237 | 7.72 | 1.58963 | 61.1 |
| | ASP | | | |
| | K: 0.000000 A: −9.173867e−006 B: −1.921243e−008 | | | |
| | C: 2.023157e−011 D: −1.285416e−013 | | | |
| 17* | −61.455 | 0.87 | | |
| | ASP | | | |
| | K: 0.000000 A: 1.544499e−006 B: −1.820226e−008 | | | |
| | C: 2.983360e−011 D: −1.039335e−013 | | | |
| 18 | 79.694 | 4.78 | 1.49700 | 81.6 |
| 19 | −67.299 | 1.30 | 1.84666 | 23.8 |
| 20 | −116.093 | D4 | | |
| 21* | −51.359 | 1.30 | 1.58375 | 59.1 |
| | ASP | | | |
| | K: 0.000000 A: −6.686067e−006 B: 7.068853e−008 | | | |
| | C: −2.516142e−010 D: 4.667443e−013 | | | |
| 22* | 45.131 | D5 | | |
| | ASP | | | |
| | K: 0.000000 A: −1.677065e−005 B: 8.822827e−008 | | | |
| | C: −3.222600e−010 D: 5.633472e−013 | | | |
| 23* | 24.140 | 8.79 | 1.49633 | 81.4 |
| | ASP | | | |
| | K: −1.000000 A: 9.383108e−006 B: 2.338285e−008 | | | |
| | C: 8.107284e−012 D: 3.940880e−014 | | | |
| 24 | −48.448 | 0.15 | | |
| 25 | 45.911 | 8.10 | 1.49700 | 81.6 |
| 26 | −21.827 | 1.00 | 1.85060 | 24.2 |
| 27 | −127.395 | 5.35 | | |
| 28* | −17.375 | 1.60 | 1.80470 | 40.9 |
| | ASP | | | |
| | K: 0.000000 A: 5.998900e−006 B: −3.794209e−008 | | | |
| | C: −3.369292e−010 D: 2.655253e−012 | | | |
| 29* | −149.235 | 0.22 | | |
| | ASP | | | |
| | K: 0.000000 A: 2.270633e−005 B: −7.935454e−008 | | | |
| | C: 2.826592e−010 D: −3.303218e−013 | | | |
| 30 | 548.724 | 4.11 | 1.92286 | 20.9 |
| 31 | −42.800 | D6 | | |
| IMG | | | | |

Table 6 below provides an example of various distances associated with the zoom lens 300 and corresponding lens modes associated with those distances.

TABLE 6

| Variable Distance | Wide-angle Mode | Intermediate Mode | Telephoto Mode |
|---|---|---|---|
| D1 | 0.800 | 12.770 | 31.597 |
| D2 | 6.252 | 6.107 | 7.103 |
| D3 | 17.647 | 8.365 | 1.400 |
| D4 | 1.772 | 4.172 | 6.481 |
| D5 | 7.709 | 5.309 | 3.0 |
| D6 | 22.475 | 30.585 | 41.684 |

Figure 6A:
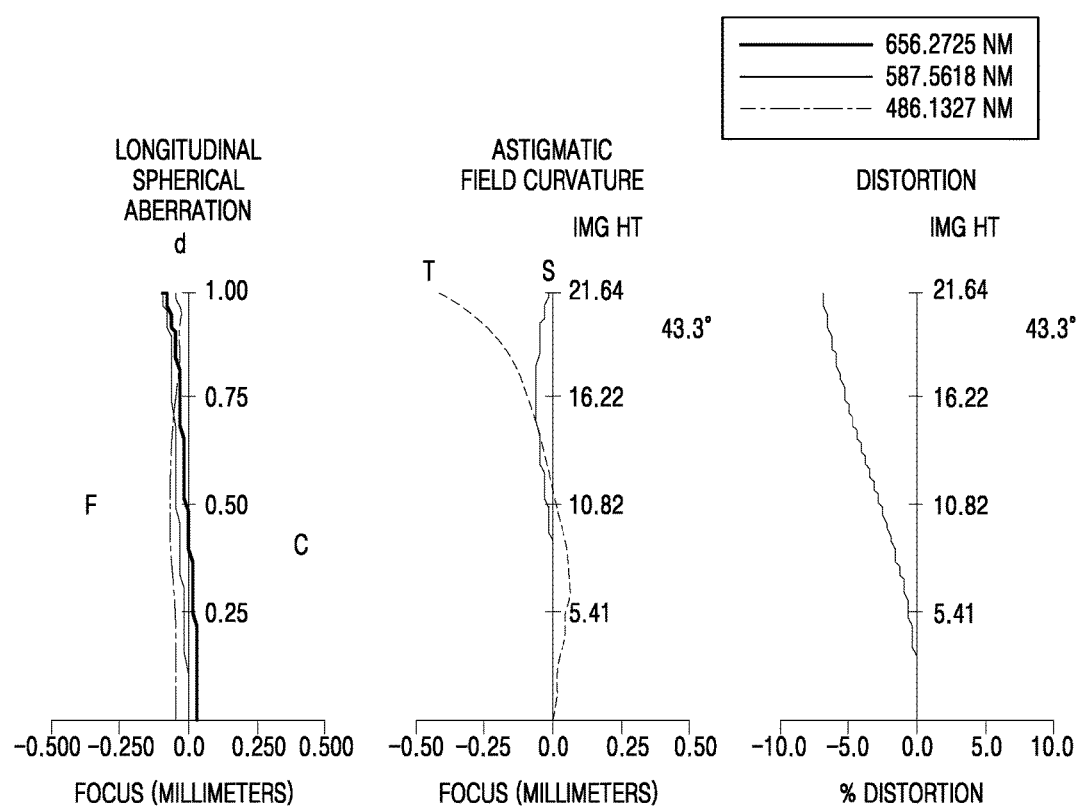
FIG. 6A is a graph illustrating longitudinal spherical aberration, astigmatic field curvature, and distortion associated with the zoom lens of FIG. 5, when the zoom lens of FIG. 5 is in a wide-angle mode, according to an embodiment of the present disclosure.
Figure 6B:
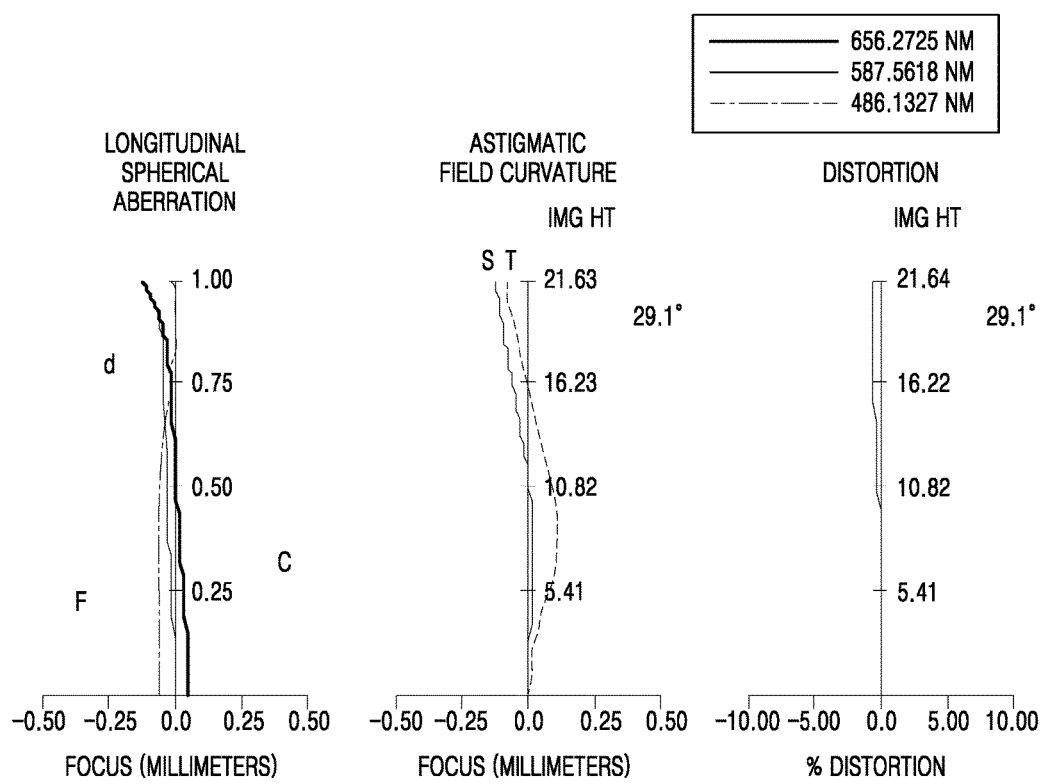
FIG. 6B is a graph illustrating longitudinal spherical aberration, astigmatic field curvature, and distortion associated with the zoom lens of FIG. 5, when the zoom lens of FIG. 5 is in an intermediate mode, according to an embodiment of the present disclosure.
Figure 6C:
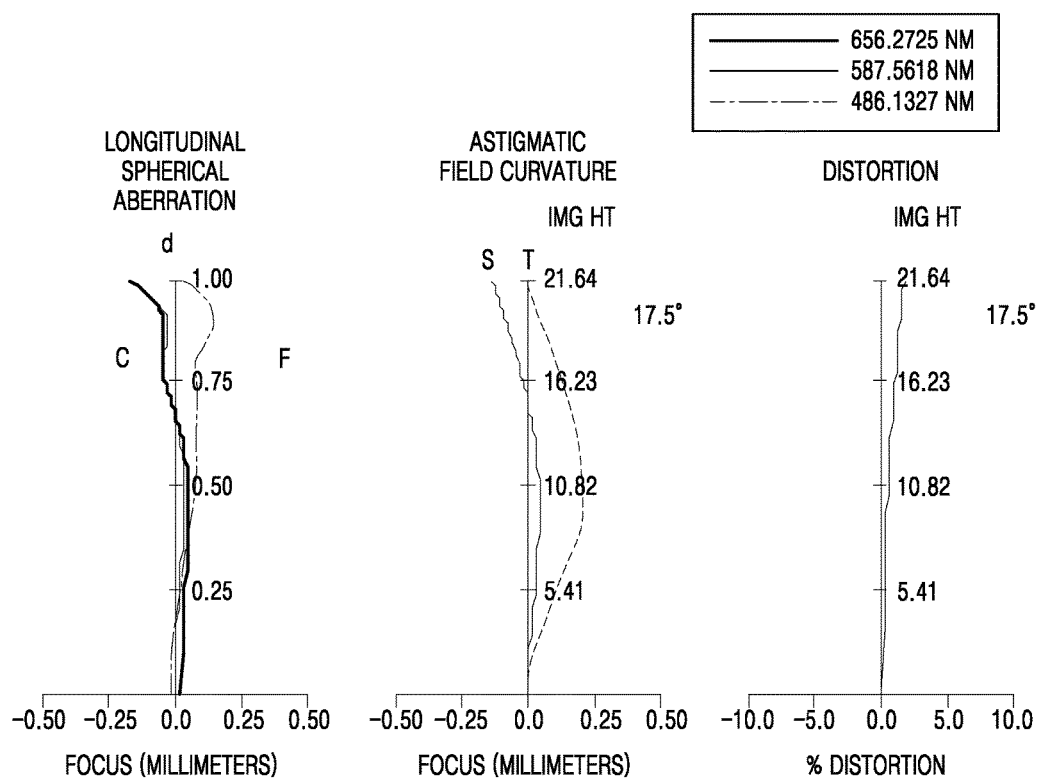
FIG. 6C is a graph illustrating longitudinal spherical aberration, astigmatic field curvature, and distortion associated with the zoom lens of FIG. 5, when the zoom lens of FIG. 5 is in a telephoto mode, according to an embodiment of the present disclosure.

FIGS. 6A, 6B, and 6C are graphs illustrating a longitudinal spherical aberration, an astigmatic field curvature, and a distortion associated with the zoom lens of FIG. 5 when the zoom lens is in a wide-angle mode, an intermediate mode, and a telephoto mode, respectively.

Fourth Embodiment

Figure 7:
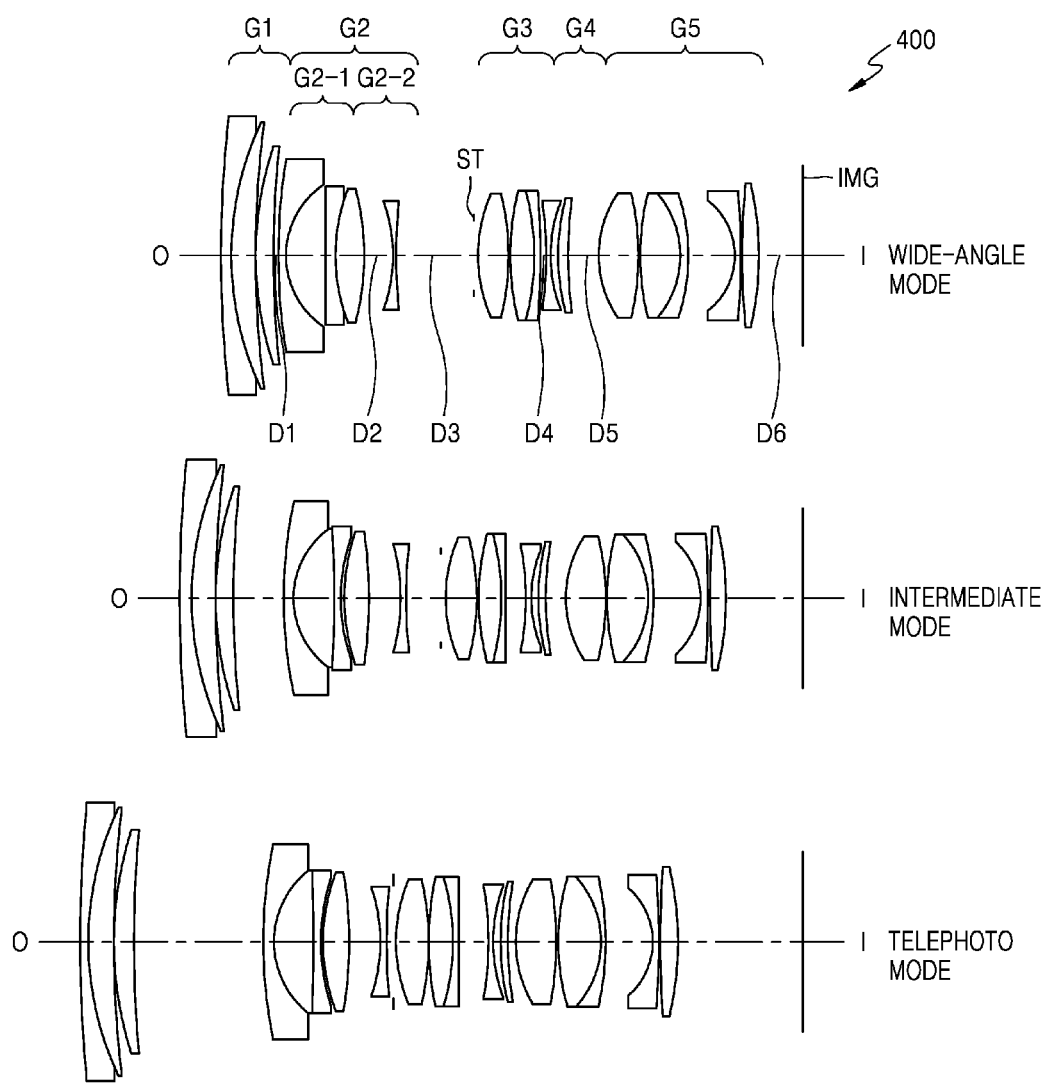
FIG. 7 is a diagram of an example of a zoom lens, according to an embodiment of the present disclosure, according to yet another embodiment of the present disclosure.

FIG. 7 is a diagram of an example of a zoom lens 400, according to another embodiment of the present disclosure (e.g., a second embodiment). Table 7 below includes design data associated with the zoom lens 400. According to the embodiment of FIG. 5, the focal length (EFL) of the zoom lens 400 is in the range of 24.68~67.74 mm, the F-number (Fno) of the zoom lens 400 is in the range of 2.9~2.9, and the viewing angle (2w) of the zoom lens 400 is in the range of 84.67~34.88°.

TABLE 7

| Lens Surface | R | Dn | Nd | Vd |
|---|---|---|---|---|
| 1 | Infinity | 0.00 | | |
| 2 | 400.000 | 2.00 | 1.84666 | 23.8 |
| 3 | 73.185 | 6.05 | 1.85128 | 39.6 |
| 4 | 247.008 | 0.15 | | |
| 5 | 84.682 | 4.32 | 1.87185 | 37.9 |
| 6 | 273.443 | D1 | | |
| 7 | 131.102 | 2.00 | 1.77030 | 38.2 |
| 8 | 21.284 | 9.79 | | |
| 9* | −220.223 | 2.00 | 1.73986 | 49.1 |
| | ASP | | | |
| | K: 15.000000 A: 4.016299e−006 B: −7.726641e−009 | | | |
| | C: 0.000000e+000 D: 0.000000e+000 | | | |
| 10* | 53.697 | 0.20 | | |
| | ASP | | | |
| | K: 3.897110 A: −4.674638e−006 B: −1.271719e−008 | | | |
| | C: −1.781693e−011 D: −3.058504e−016 | | | |
| 11 | 45.493 | 6.31 | 1.84666 | 23.8 |
| 12 | −86.106 | D2 | | |
| 13 | −39.979 | 1.00 | 1.61800 | 63.4 |
| 14 | 196.369 | D3 | | |
| ST | Infinity | 0.90 | | |
| 16* | 31.998 | 7.54 | 1.58963 | 61.1 |
| | ASP | | | |
| | K: 0.000000 A: −9.209865e−006 B: 5.172831e−009 | | | |
| | C: −4.513903e−011 D: 7.212510e−014 | | | |
| 17* | −60.447 | 0.15 | | |
| | ASP | | | |
| | K: 0.000000 A: −1.459813e−006 B: 7.954455e−009 | | | |
| | C: −4.822302e−011 D: 8.799402e−014 | | | |
| 18 | 54.259 | 5.77 | 1.49700 | 81.6 |
| 19 | −50.223 | 1.30 | 1.84666 | 23.8 |
| 20 | −614.459 | D4 | | |
| 21 | −81.017 | 1.00 | 1.59349 | 67.0 |
| 22 | 33.270 | 1.98 | | |
| 23* | 57.428 | 2.02 | 1.68381 | 31.3 |
| | ASP | | | |
| | K: 0.000000 A: 1.068146e−005 B: −1.633424e−008 | | | |
| | C: 1.295344e−011 D: 6.078530e−014 | | | |
| 24* | 84.370 | D5 | | |
| | ASP | | | |
| | K: 0.000000 A: 2.904675e−006 B: −8.662841e−009 | | | |
| | C: −1.481837e−011 D: 9.340780e−014 | | | |
| 25* | 23.000 | 9.66 | 1.49633 | 81.4 |
| | ASP | | | |
| | K: −1.000000 A: −2.580667e−007 B: 2.525059e−008 | | | |
| | C: −3.142603e−011 D: 9.081093e−014 | | | |
| 26 | −67.437 | 0.80 | | |
| 27 | 56.976 | 9.81 | 1.49700 | 81.6 |
| 28 | −21.444 | 1.20 | 1.89397 | 36.3 |
| 29 | −57.668 | 11.38 | | |
| 30* | −16.431 | 1.60 | 1.80470 | 40.9 |
| | ASP | | | |
| | K: 0.000000 A: 1.629470e−005 B: 1.330465e−008 | | | |
| | C: −2.116913e−010 D: 2.566211e−012 | | | |
| 31* | −71.973 | 0.46 | | |
| | ASP | | | |
| | K: 0.000000 A: 1.865374e−005 B: −6.026081e−008 | | | |
| | C: 2.132200e−010 D: −2.020208e−013 | | | |
| 32 | 276.072 | 3.75 | 1.92286 | 20.9 |
| 33 | −79.842 | D6 | | |
| IMG | | | | |

Table 4 below provides an example of various distances associated with the zoom lens 400 and corresponding lens modes associated with those distances.

TABLE 8

| Variable Distance | Wide-angle Mode | Intermediate Mode | Telephoto Mode |
|---|---|---|---|
| D1 | 0.800 | 12.067 | 31.597 |
| D2 | 7.286 | 7.731 | 7.711 |
| D3 | 18.518 | 8.633 | 1.700 |
| D4 | 1.594 | 4.528 | 7.262 |
| D5 | 7.168 | 4.234 | 1.500 |
| D6 | 10.551 | 18.342 | 30.063 |

Figure 8A:
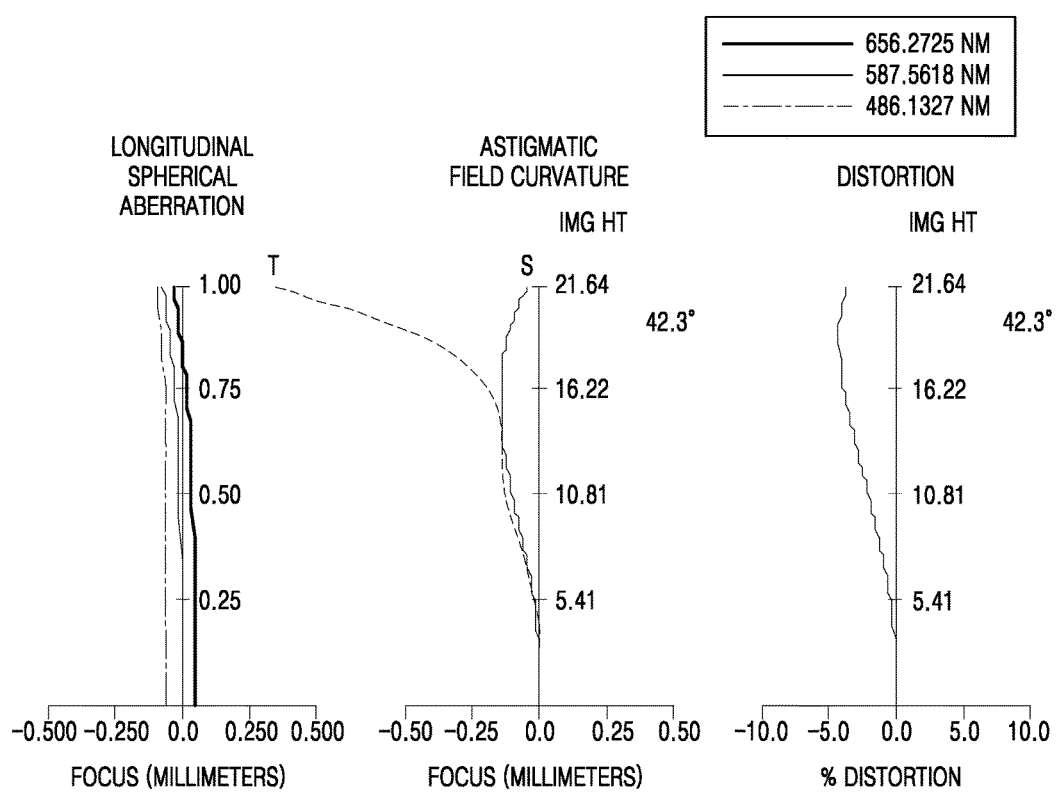
FIG. 8A is a graph illustrating longitudinal spherical aberration, astigmatic field curvature, and distortion associated with the zoom lens of FIG. 7, when the zoom lens of FIG. 7 is in a wide-angle mode, according to an embodiment of the present disclosure.
Figure 8B:
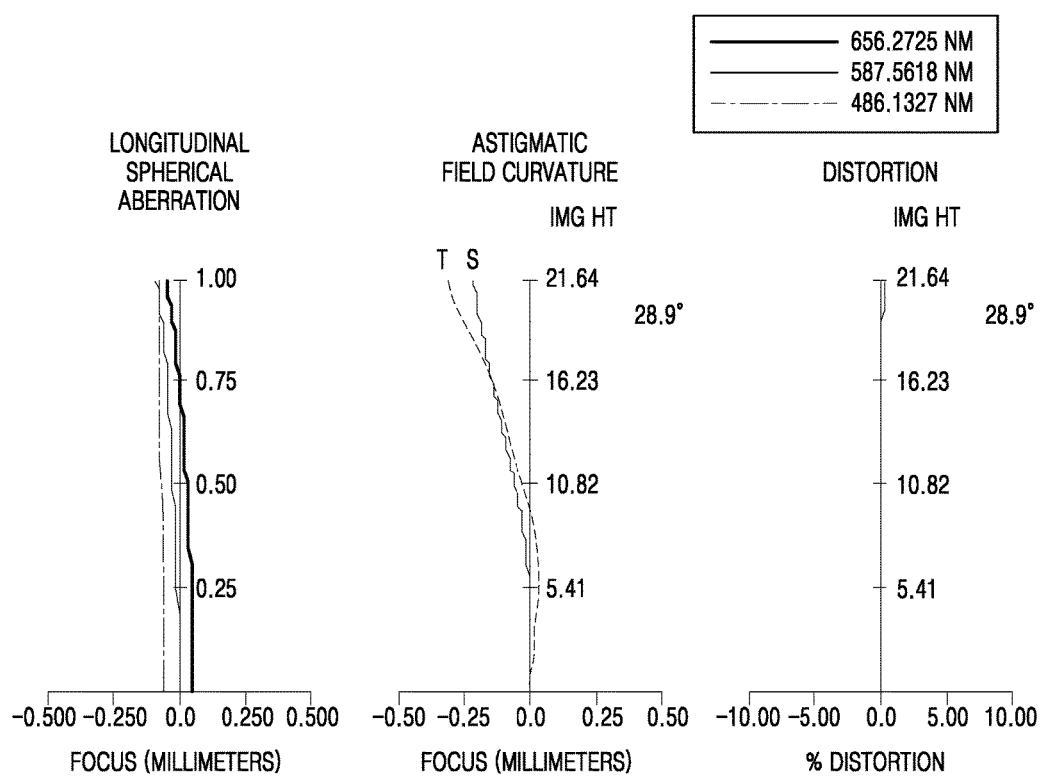
FIG. 8B is a graph illustrating longitudinal spherical aberration, astigmatic field curvature, and distortion associated with the zoom lens of FIG. 7, when the zoom lens of FIG. 7 is in an intermediate mode, according to an embodiment of the present disclosure.
Figure 8C:
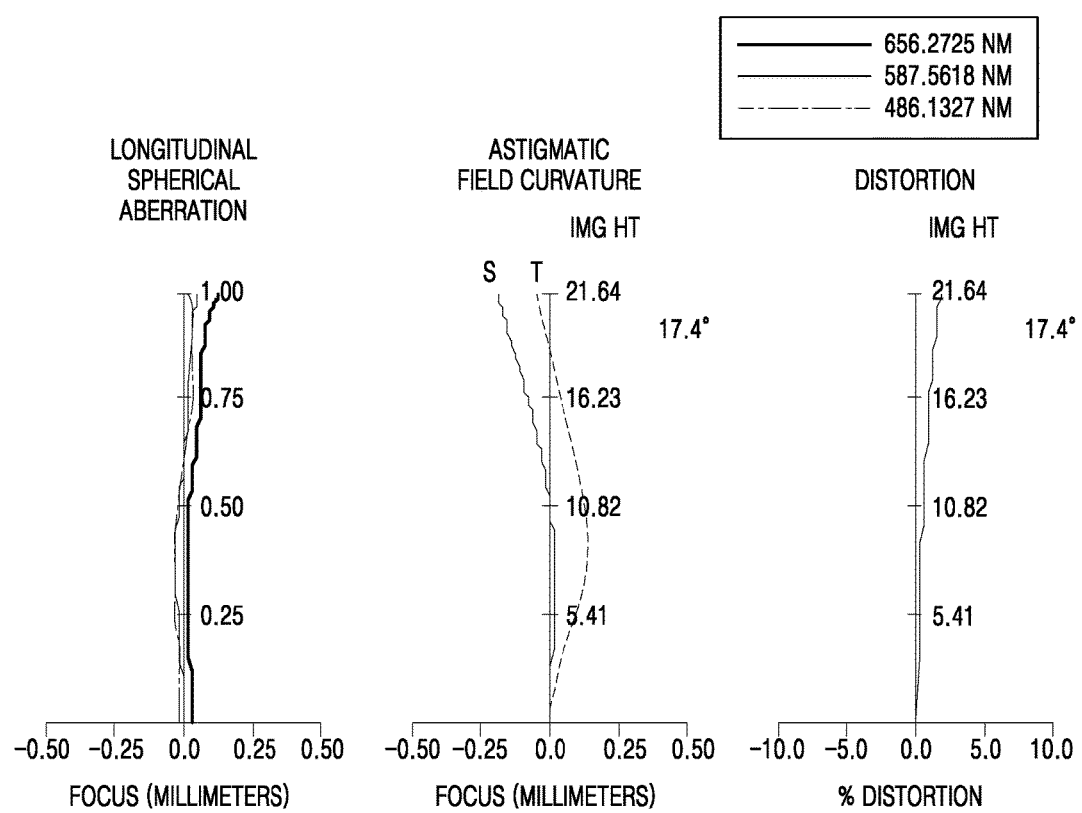
FIG. 8C is a graph illustrating longitudinal spherical aberration, astigmatic field curvature, and distortion associated with the zoom lens of FIG. 7, when the zoom lens of FIG. 7 is in a telephoto mode, according to an embodiment of the present disclosure.

FIGS. 8A, 8B, and 8C are graphs illustrating a longitudinal spherical aberration, an astigmatic field curvature, and a distortion associated with the zoom lens 400 when the zoom lens is in a wide-angle mode, an intermediate mode, and a telephoto mode, respectively.

The following table illustrates the values of the coefficients and ratios associated with Equations 1-4 for Embodiments 1-4, respectively:

TABLE 9

| | 1st Embodiment | 2nd Embodiment | 3rd Embodiment | 4th Embodiment |
|---|---|---|---|---|
| $BF_w/FL_w$ (Eq. 1) | 0.53 | 0.67 | 0.91 | 0.43 |
| $FL\_RG_w/BF_w$ (Eq. 2) | 1.10 | 1.09 | 1.21 | 1.10 |
| $FL\_Fr_w/FL\_RG_w$ (Eq. 3) | 1.00 | 0.96 | 0.88 | 1.10 |
| vd3C_ASP (Eq. 4) | 85.3 | 84.9 | 81.4 | 81.4 |

The zoom lenses according to various embodiments may have a short back focal length and may be applied to compact photographic apparatuses, for example, to mirrorless cameras. Additionally or alternatively, the focusing lens group may be configured to be compact and lightweight for fast focusing. The zoom lenses according to various embodiments may be used in photographic apparatuses including image sensors. The photographic apparatuses according to various embodiments may include digital cameras, interchangeable lens cameras, video cameras, mobile phone cameras, mirrorless cameras, compact mobile device cameras, and/or any other suitable type of photographic device.

Figure 9:
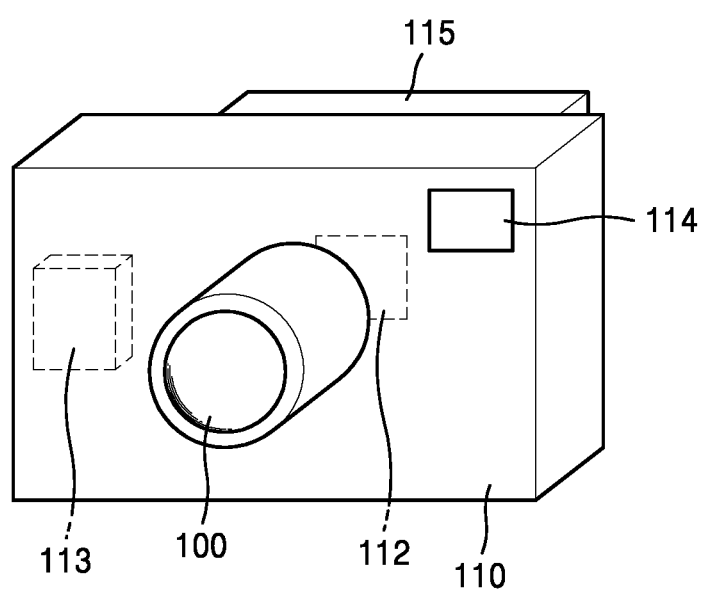
FIG. 9 is a diagram of an example of a photographic apparatus, according to an embodiment of the present disclosure.

FIG. 9 is a diagram of an example of a photographic apparatus 110 including a zoom lens, according to an embodiment of the present disclosure. The photographic apparatus 110 may include a zoom lens 100 and an image sensor 112 that receives an optical image formed by the zoom lens 100 and converts the optical image into an electrical image signal. The zoom lenses described with reference to FIGS. 1 to 8 may be used as the zoom lens 100. In some implementations, the photographic apparatus 110 may include a recording unit 113 for storing information corresponding to a subject image resulting from the photoelectric conversion by the image sensor 112, and a viewfinder 114 for observing the subject image. Furthermore, in some implementations, a display unit 115 may be provided to display the subject image. Herein, although an example of providing the viewfinder 114 and the display unit 115 separately is illustrated, only a display unit may be provided without a viewfinder. The photographic apparatus illustrated in FIG. 9 is merely an example, and the present disclosure is not limited thereto.

FIGS. 1-9 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While one or more embodiments have been described with reference to the figures, it will be understood by those of ordinary skill in the art that various changes in form and details may be made therein without departing from the spirit and scope as defined by the following claims.

What is claimed is:

1. A zoom lens comprising:
a first lens group having a positive refractive power;
a second lens group having a negative refractive power;
a third lens group having a positive refractive power;
a fourth lens group having a negative refractive power; and
a fifth lens group having a positive refractive power,
wherein the first lens group, the second lens group, the third lens group, the fourth lens group, and the fifth lens group are arranged sequentially from an object side to an image side of the zoom lens,
wherein the first lens group comprises a first doublet lens and a lens having a positive refractive power,
wherein the second lens group comprises a first sub-lens group having a negative refractive power and a second sub-lens group having a negative refractive power that is arranged to perform a focusing function,
wherein each of the first lens group, the second lens group, the third lens group, the fourth lens group, and the fifth lens group is arranged to move when the zoom lens is zoomed,
wherein the zoom lens satisfies the following condition:

$$0.4 < BF_W/FL_W < 1.1,$$

where $FL_W$ denotes a total focal length of the zoom lens when the zoom lens is in a wide-angle mode and $BF_W$ denotes a back focal length of the zoom lens when the zoom lens is in the wide-angle mode, and
wherein the fifth lens group comprises at least one positive lens and a second doublet lens.

2. The zoom lens of claim 1, further comprising an iris diaphragm disposed between the second lens group and the third lens group.

3. The zoom lens of claim 1, wherein the zoom lens satisfies the following condition:

$$0.9 < FL\_RG_W/BF_W < 1.35,$$

where $FL\_RG_W$ denotes a combined focal length of the third lens group, the fourth lens group, and the fifth lens group when the zoom lens is in the wide-angle mode.

4. The zoom lens of claim 1, wherein the zoom lens satisfies the following condition:

$$0.75 < \frac{FL\_Fr_W}{FL\_RG_W} < 1.25,$$

where $FL\_RG_W$ denotes a combined focal length of the third lens group, the fourth lens group, and the fifth lens group when the zoom lens is in the wide-angle mode and FL_FG$_W$ denotes a combined focal length of the first lens group and the second lens group when the zoom lens is in the wide-angle mode.

5. A zoom lens comprising:

a first lens group having a positive refractive power;

a second lens group having a negative refractive power;

a third lens group having a positive refractive power;

a fourth lens group having a negative refractive power; and a fifth lens group having a positive refractive power, wherein the first lens group, the second lens group, the third lens group, the fourth lens group, and the fifth lens group are arranged sequentially from an object side to an image side of the zoom lens, wherein the first lens group comprises a first doublet lens and a lens having a positive refractive power, wherein the second lens group comprises a first sub-lens group having a negative refractive power and a second sub-lens group having a negative refractive power that is arranged to perform a focusing function, wherein each of the first lens group, the second lens group, the third lens group, the fourth lens group, and the fifth lens group is arranged to move when the zoom lens is zoomed, wherein the zoom lens satisfies the following condition:

$$0.4 < BF_W/FL_W < 1.1,$$

where FL$_W$ denotes a total focal length of the zoom lens when the zoom lens is in a wide-angle mode and BF$_W$ denotes a back focal length of the zoom lens when the zoom lens is in the wide-angle mode, wherein the fifth lens group comprises at least one positive lens and a second doublet lens, and wherein the third lens group comprises at least one other positive lens and a third doublet lens.

6. The zoom lens of claim 1, wherein the fourth lens group comprises at least one negative lens.

7. The zoom lens of claim 1, wherein the fourth lens group performs image stabilization.

8. The zoom lens of claim 1, wherein the fifth lens group comprises at least one aspherical lens.

9. The zoom lens of claim 8, wherein the aspherical lens satisfies the following condition:

$$80 < vd3C\_ASP,$$

where vd3C_ASP denotes an Abbe number of the aspherical lens.

10. The zoom lens of claim 1, wherein the fourth lens group comprises at least one aspherical lens.

11. The zoom lens of claim 1, wherein when zooming from the wide angle mode to a telephoto mode, the third lens group and the fifth lens group move such that a distance between the third lens group and the fifth lens group does not change.

12. The zoom lens of claim 1, wherein the first sub-lens group of the second lens group comprises at least one negative lens having a refractive index of 1.73 or more.

13. The zoom lens of claim 1, wherein the second sub-lens group of the second lens group comprises only one lens.

14. A photographic apparatus comprising:

a zoom lens; and an image sensor receiving an image formed by the zoom lens, wherein the zoom lens comprises a first lens group having a positive refractive power, a second lens group having a negative refractive power, a third lens group having a positive refractive power, a fourth lens group having a negative refractive power, and a fifth lens group having a positive refractive power, wherein the first lens group comprises a first doublet lens and a lens having a positive refractive power, wherein the second lens group comprises a first sub-lens group having a negative refractive power and a second sub-lens group having a negative refractive power that is arranged to perform a focusing function, wherein each of the first lens group, the second lens group, the third lens group, the fourth lens group, and the fifth lens group is arranged to move when the zoom lens is zoomed from a wide-angle mode to a telephoto mode, wherein the zoom lens satisfies the following condition:

$$0.4 < BF_W/FL_W < 1.1,$$

where FL$_W$ denotes a total focal length of the zoom lens when the zoom lens is in a wide-angle mode and BF$_W$ denotes a back focal length of the zoom lens when the zoom lens is in the wide-angle mode, and wherein the fifth lens group comprises at least one positive lens and a second doublet lens.

* * * * *